(12) United States Patent  (10) Patent No.: US 9,904,855 B2
Chandraker et al.  (45) Date of Patent: Feb. 27, 2018

(54) ATOMIC SCENES FOR SCALABLE TRAFFIC SCENE RECOGNITION IN MONOCULAR VIDEOS

(71) Applicant: NEC Laboratories America, Inc., Princeton, NJ (US)

(72) Inventors: Manmohan Chandraker, Santa Clara, CA (US); Chao-Yeh Chen, Austin, TX (US); Wongun Choi, Lexington, MA (US)

(73) Assignee: NEC Corporation (JP)

( * ) Notice: Subject to any disclaimer, the term of this patent is extended or adjusted under 35 U.S.C. 154(b) by 195 days.

(21) Appl. No.: 14/882,794

(22) Filed: Oct. 14, 2015

(65) Prior Publication Data

US 2016/0140400 A1  May 19, 2016

Related U.S. Application Data

(60) Provisional application No. 62/079,225, filed on Nov. 13, 2014.

(51) Int. Cl.
*H04N 7/18* (2006.01)
*G06K 9/00* (2006.01)
*G08G 1/16* (2006.01)
*G06T 7/579* (2017.01)
(Continued)

(52) U.S. Cl.
CPC .......... *G06K 9/00785* (2013.01); *G06T 7/207* (2017.01); *G06T 7/246* (2017.01); *G06T 7/251* (2017.01); *G06T 7/579* (2017.01); *G08G 1/16* (2013.01); *G08G 1/166* (2013.01); *G06T 2200/04* (2013.01); *G06T 2207/20016* (2013.01); *G06T 2207/20081* (2013.01); *G06T 2207/30236* (2013.01); *G06T 2207/30241* (2013.01); *G06T 2207/30244* (2013.01); *G06T 2207/30252* (2013.01)

(58) Field of Classification Search
CPC ..... G06K 9/00785; G06T 7/579; G06T 7/251; G06T 7/246; G06T 7/207; G06T 2207/30244; G06T 2207/30241; G06T 2207/30236; G06T 2207/20081; G06T 2207/20016; G06T 2200/04; G08G 1/166; G08G 1/16
See application file for complete search history.

(56) References Cited

U.S. PATENT DOCUMENTS

| | | | | |
|---|---|---|---|---|
| 2012/0062743 A1* | 3/2012 | Lynam | ................... | B60Q 9/005 348/148 |
| 2013/0129307 A1* | 5/2013 | Choe | ................... | H04N 5/2621 386/227 |

(Continued)

*Primary Examiner* — Tat Chio
(74) *Attorney, Agent, or Firm* — Joseph Kolodka (57) ABSTRACT

Systems and methods are disclosed to provide an Advanced Warning System (AWS) for a driver of a vehicle, by capturing traffic scene types from a single camera video; generating real-time monocular SFM and 2D object detection from the single camera video; detecting a ground plane from the real-time monocular SFM and the 2D object detection; performing dense 3D estimation from the real-time monocular SFM and the 2D object detection; generating a joint 3D object localization from the ground plane and dense 3D estimation; and communicating a situation that requires caution to the driver.

20 Claims, 6 Drawing Sheets

(51) Int. Cl.
*G06T 7/246* (2017.01)
*G06T 7/207* (2017.01)

(56) References Cited

U.S. PATENT DOCUMENTS

| | | | | |
|---|---|---|---|---|
| 2013/0282747 A1* | 10/2013 | Cheng | ............... | G06F 17/30023 |
| | | | | 707/758 |
| 2013/0332057 A1* | 12/2013 | Moore | ................. | G08G 1/0962 |
| | | | | 701/118 |
| 2014/0160244 A1* | 6/2014 | Berberian | .......... | G06K 9/00798 |
| | | | | 348/46 |
| 2014/0198184 A1* | 7/2014 | Stein | ................. | G06K 9/00791 |
| | | | | 348/47 |
| 2015/0063628 A1* | 3/2015 | Bernal | ............... | G06K 9/00771 |
| | | | | 382/103 |

\* cited by examiner

Inference and Learning 300

Inference 301

Figure 1:
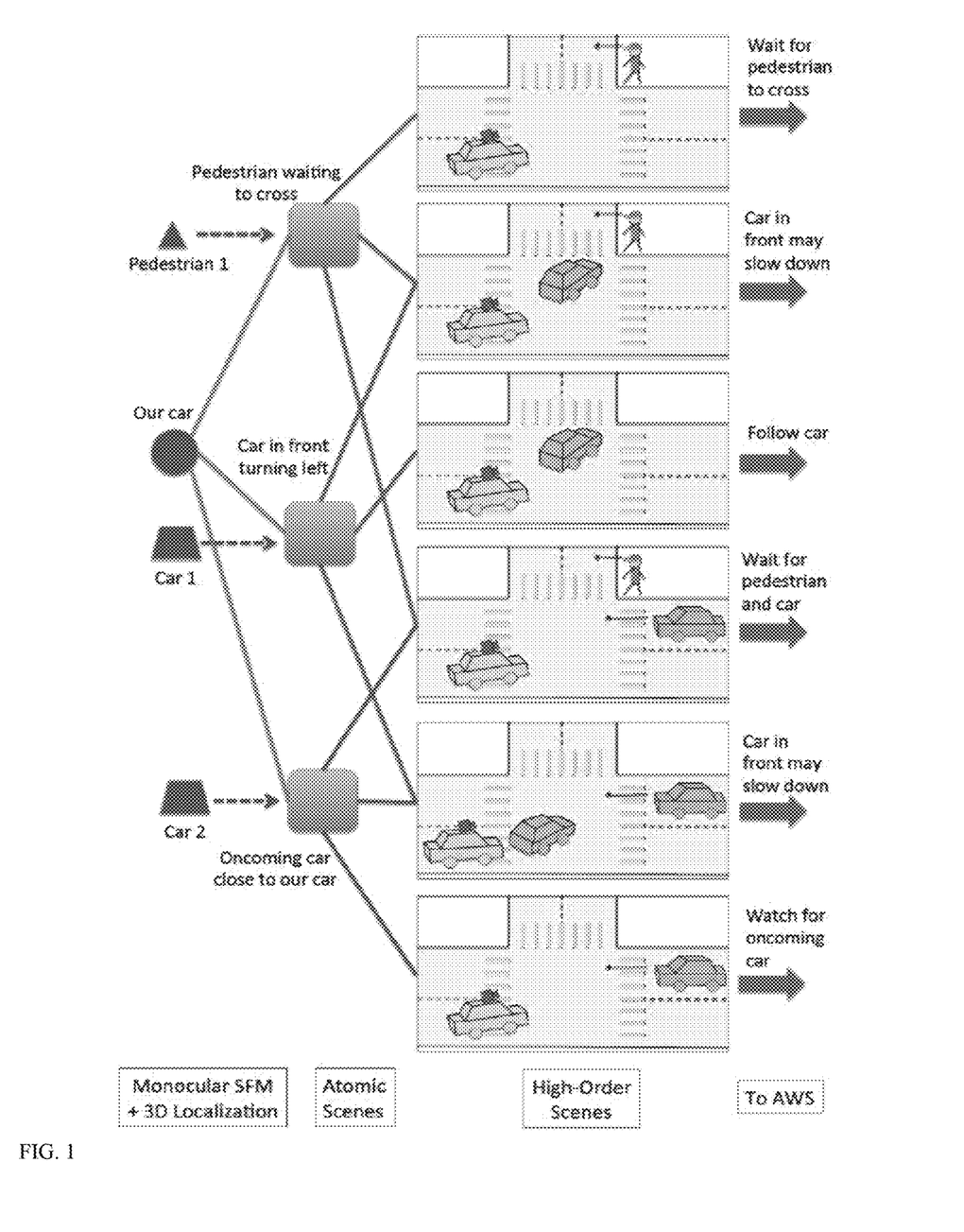
FIG. 1 shows exemplary atomic scenes and highorder scenes for visual scene recognition.
Figure 2:
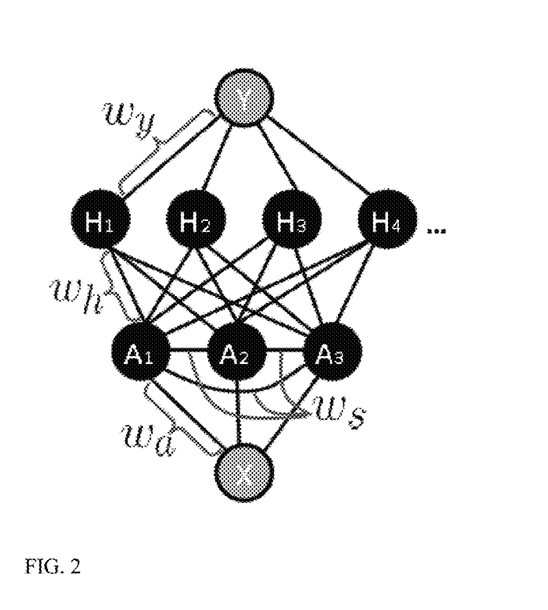
FIG. 2 shows one exemplary model that uses two types of observations (X, Y) to infer atomic and high-order scenes.

As shown in Figure 2, our proposed model contains four types of edges: the set of weights denoted $w_o$, utilize the low-level features to predict an atomic scene $A_j$, the $w_h$ utilize the high-level features to predict a high order scene $H_i$, the $w_p$ densely connect the prediction of atomic scenes and high order scenes, while the $w_a$ capture the correlation between different atomic scenes. Given the vector of learned weights $w = \{w_o, w_p, w_h, w_a\}$, we define a scoring function based on current observations $(X, Y)$ and scene labels $(A, H)$ as:

$$S_w(X,Y,A,H) = \sum_i w_o^T \psi(X, A_i) + \sum_j w_p^T \chi(Y, H_j)$$
$$+ \sum_{i,j} w_h^T \Omega(A_i, H_j) + \sum_{i,j,i \neq j} w_a^T \Phi(A_i, A_j),$$

- Given labels for atomic scenes, use belief propagation to infer high-order scenes.
- Given labels for high-order scenes, find Chow-Liu decomposition of graph.
- Use belief propagation to infer labels for atomic scenes.
- Alternate between the above steps until labels converge.

Learning 302

To learn the weights $w = \{w_o, w_p, w_h, w_a\}$ in Figure 2 from annotated scene labels $(A^i, H^i)$, we use the cutting plane method. For each iteration, we use the weights $w = \{w_o, w_p, w_h, w_a\}$ to find the most violated constraint, as:

$$S_w(X,Y,A,H) = S_w(X,Y,A,H^i) + L(A, A^i) + L(H, H^i),$$

where we have defined loss functions:

$$L(A_i, A_i^*) = \sum_{i=1}^{|A|} I(A_i \neq A_i^*),$$

$$L(H_j, H_j^*) = \sum_{j=1}^{|H|} I(H_j \neq H_j^*),$$

with $I$ the indicator function.

ATOMIC SCENES FOR SCALABLE TRAFFIC SCENE RECOGNITION IN MONOCULAR VIDEOS

This application claims priority to Provision Application 62/079,225 filed Nov. 13, 2014, the content of which is incorporated by reference.

BACKGROUND

The present application relates to Traffic Scene Recognition in Monocular Videos.

In the US alone, road accidents cost over 32000 lives and $275 billion in economic losses annually. Improved advanced warning systems (AWS) in automobiles can alleviate some of these costs. While conventional collision avoidance systems can detect objects that pose a danger, the AWS window can be significantly expanded by a semantically meaningful recognition of traffic scenes. Visual scene recognition, thus, can play a significant role in predicting the possibility of danger in traffic videos. A few key challenges faced by scene recognition are the complexity of traffic scenarios where multiple scenes may occur simultaneously with several participants involved, the vast number of possible scene types and the need for online, real-time solutions. The efficacy of advance warning systems (AWS) in automobiles can be significantly enhanced by semantic recognition of traffic scenes that pose a potential danger. However, the complexity of road scenes and the need for real-time solutions pose key challenges.

SUMMARY

In one aspect, systems and methods are disclosed to provide an Advanced Warning System (AWS) for a driver of a vehicle, by capturing traffic scene types from a single camera video; generating real-time monocular SFM and 2D object detection from the single camera video; detecting a ground plane from the real-time monocular SFM and the 2D object detection; performing dense 3D estimation from the real-time monocular SFM and the 2D object detection; generating a joint 3D object localization from the ground plane and dense 3D estimation; and communicating a situation that requires caution to the driver.

In another aspect, atomic scenes and high-order scenes are used for visual scene recognition. High-order scenes carry semantic meaning for AWS, while atomic scenes are defined based on 3D object localization and are easy to learn. Atomic scenes allow scalability, since a few of them can combine to enhance prediction rates for a variety of high-order scenes. A hierarchical model then captures atomic scene co-occurrence relations and allows for real-time inference to detect possibly simultaneous, complex scenes with multiple traffic participants.

The system provides a framework for monocular traffic scene recognition, relying on a decomposition into high-order and atomic scenes to meet challenging driving conditions. High-order scenes carry semantic meaning useful for AWS applications, while atomic scenes are easy to learn and represent elemental behaviors based on 3D localization of individual traffic participants. Atomic scenes allow our framework to be scalable, since a few of them combine to influence prediction for a wide array of high-order scenes.

Advantages of the system may include one or more of the following. The system robustly handles the challenging problem of fast and scalable recognition of simultaneously occurring complex traffic scenes, observed from a single camera on a moving car. The hierarchical model captures co-occurrence and mutual exclusion relationships while incorporating both low-level trajectory features and high-level scene features, with parameters learned using a structured support vector machine. The system uses efficient inference that exploits the structure of the model to obtain real-time rates. A large-scale dataset is used for scene recognition that consists of challenging traffic videos of inner-city scenes, for which we release ground truth annotations of scene types and object bounding boxes, as well as state-of-the-art 3D object localization outputs.

DESCRIPTION

Figure 3:
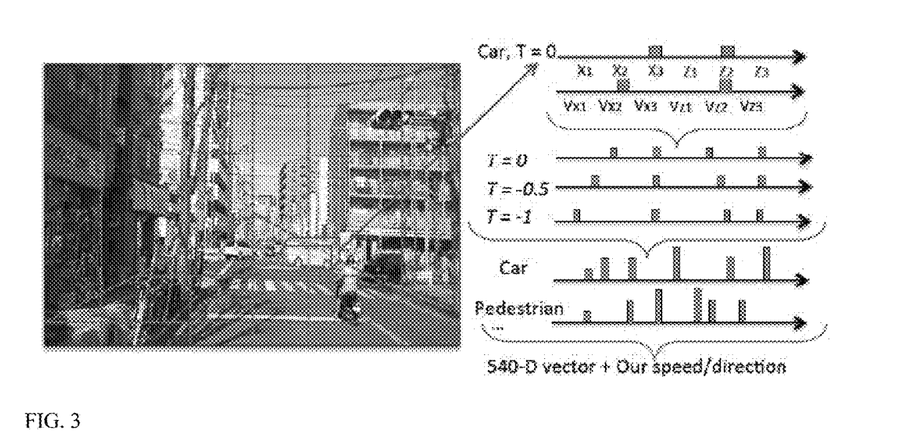
FIGS. 3-4 show exemplary X and Y features.
Figure 4:
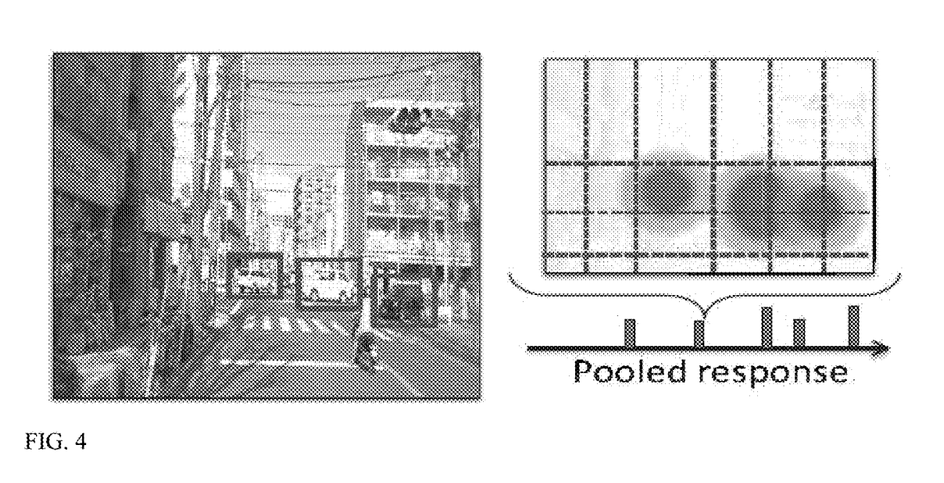
Figure 5A:
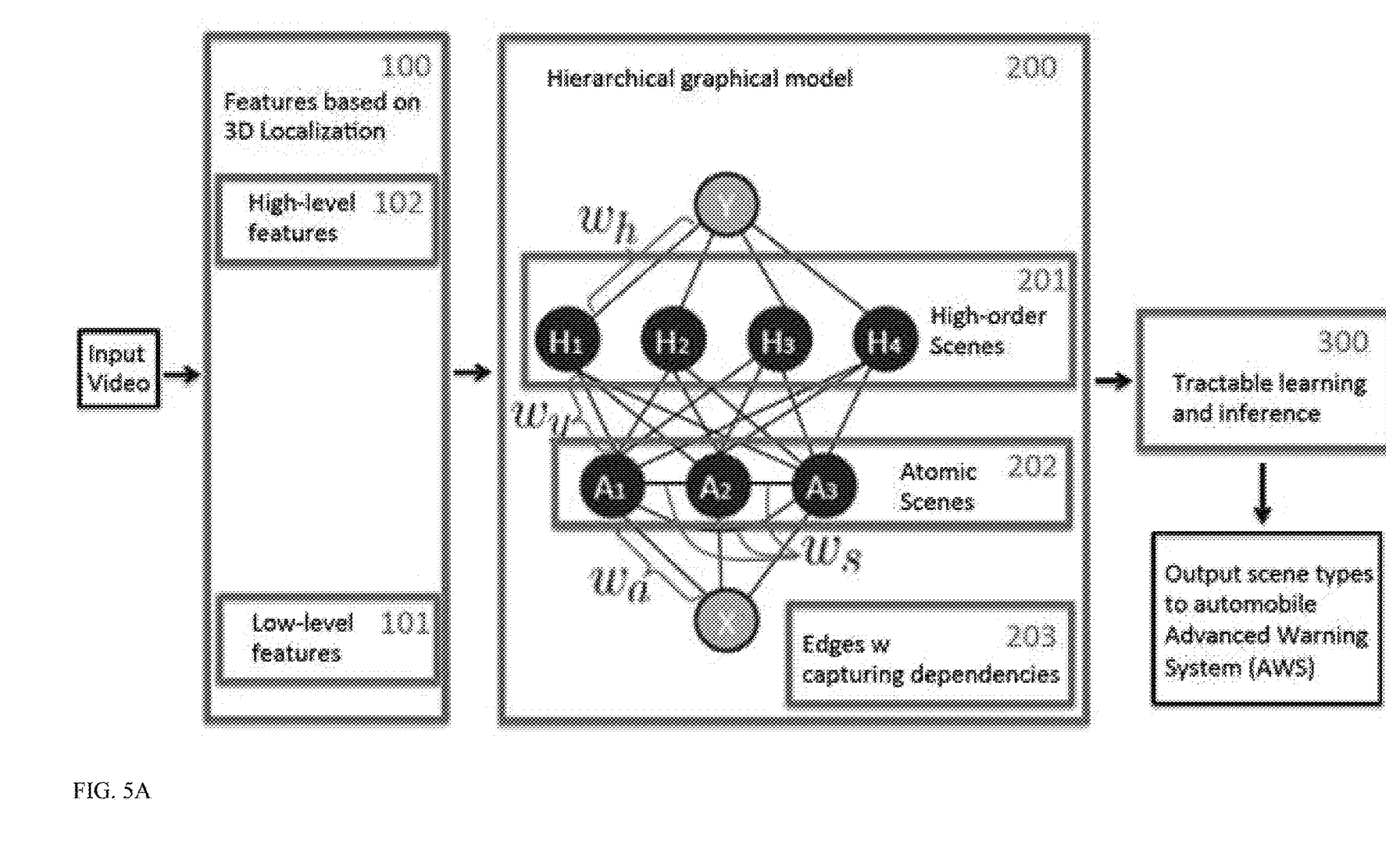
FIGS. 5A-5B show an exemplary real-time traffic scene recognition for detecting dangerous situations.
Figure 5B:
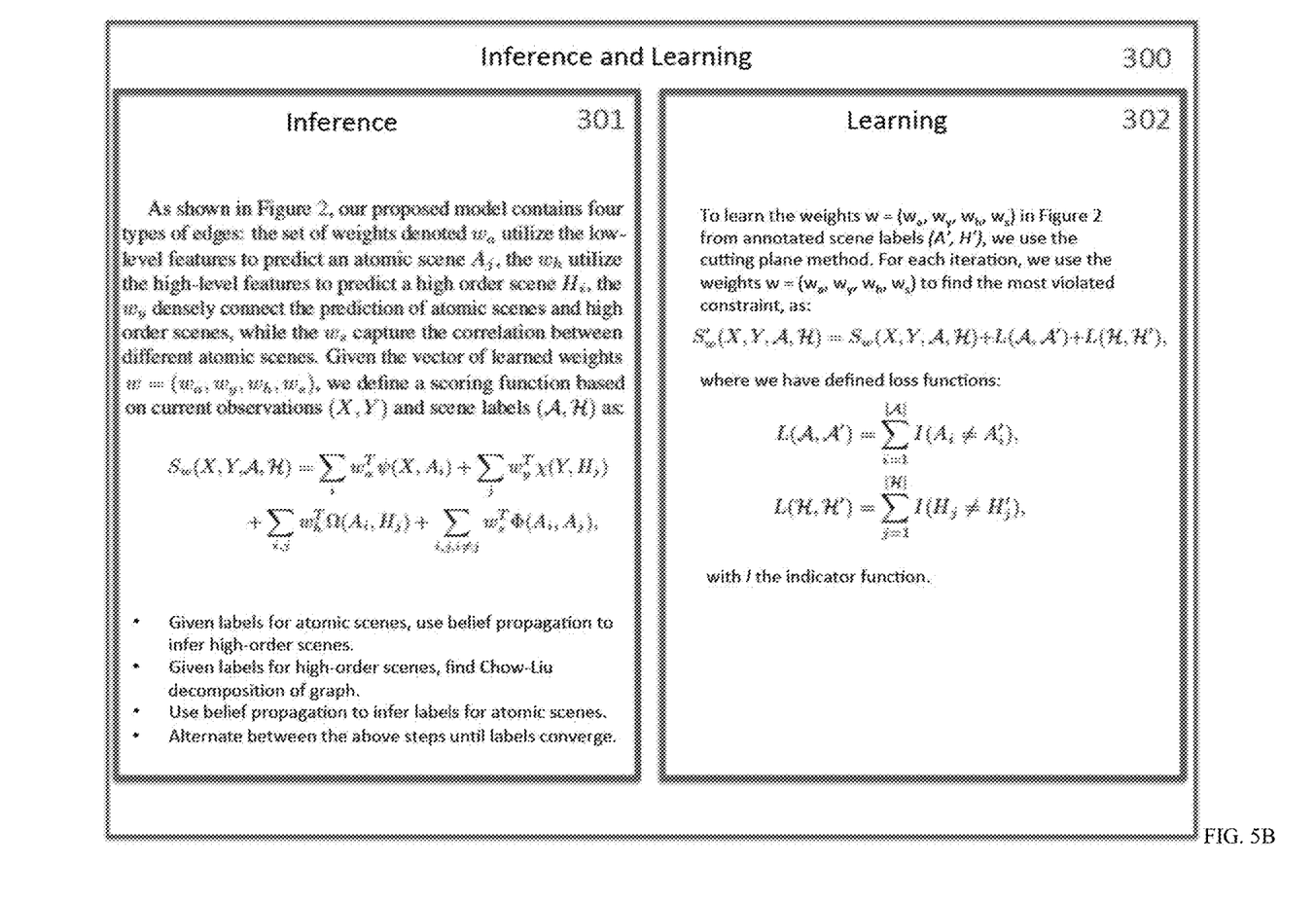

FIG. 1-4 shows exemplary models to handle scenes for visual recognition, while FIG. 5 shows an exemplary system with real-time traffic scene recognition for detecting dangerous situations. The system robustly handles the challenging problem of fast and scalable recognition of simultaneously occurring complex traffic scenes, observed from a single camera on a moving car.

Given the large number of possible scene types and their mutual dependences, it is inefficient to build an independent model for each. However, one may handle this complexity by handling various common properties shared across different scenes. For example, consider the case in FIG. 1 where our car is turning left and we can determine the position and motion of the other traffic participants. The overall configuration of the scene can be understood in terms of the individual participants—Is another car approaching from front? Is a pedestrian at the crosswalk on the left? Is another car turning in front of us, but slowed down observing the pedestrian on the left? Intuitively, measuring the position and velocity of a few traffic participants can allow us to reason about a large number of possible scenes types.

The system applies the concepts of atomic scenes and high-order scenes. Atomic scenes capture elemental aspects corresponding to individual participants in a traffic video, whereas high-order scenes carry semantic meaning useful for AWS applications. The underlying motivation is scalability, whereby a small set of atomic scenes that are easier to detect can influence predictions for a larger number of complex high-order scenes. Our system must incorporate domain knowledge from experts, thus, we work in a supervised setting. So, another crucial requirement for atomic scenes is ease of labeling data and learning. In order to meet the above requirements, atomic scenes that depend only on 3D positions and velocities of individual traffic participants, exploiting recent advances in object detection, tracking, monocular structure for motion (SFM) and 3D localization.

Since several high-order scenes may occur simultaneously, the problem of scene recognition in traffic videos is akin to multi-label prediction. Thus, our model engine for scene recognition must account for mutual exclusion and co-occurrence relationships between atomic scenes. A hierarchical model engine that allows for both scalability and co-occurrence relationships. Our model engine is flexible and can handle various feature types. In particular, we use low-level features based on 3D trajectories of individual traffic participants, as well as high-level features that capture more holistic information. A structured support vector machine (SVM) framework is used for learning model parameters, while the model hierarchy is exploited to achieve fast inference.

To build and validate our system, we present a large-scale dataset of traffic scenes in inner-city environments, with annotations for scene labels and ground truth bounding boxes for all traffic participants. We also enumerate scene types specified by domain experts and determine a smaller set of atomic scenes to encompass them.

The above system provides an efficient approach to traffic scene recognition, through a model engine that allows multi-label detection with several simultaneously occurring scenes, captures co-occurrences and flexibly incorporates various types of inputs. Atomic scenes are used that are defined by 3D localization of individual traffic participants, are easy to learn and detect, yet parsimoniously capture the wide variety of complex scenes in traffic videos. A feature design robust to motion and clutter in traffic scenes and inference approach that exploits the model hierarchy to achieve fast scene recognition. A dataset with ground truth annotations, along with state-of-the-art SFM, object detection and 3D localization outputs, as well as comparative results on several baselines.

The system detects scene types in traffic videos obtained from a single camera, that require caution on the driver's part. The scenes of interest are semantically meaningful and represent potential inputs for an early warning system. Clearly, in the eventual application, the number of scene types is large. Moreover, real traffic scenes also involve complex configurations of traffic participants. Thus, we must adopt an approach that scales well with the number of scene types, while also allowing a systematic decomposition of the complexity of traffic configurations.

The system considers a categorization of scenes into high-order and atomic scenes. High-order scenes are the categories of interest that carry semantic meaning in the context of AWS applications, but might be too complex to model individually. A small number of elemental scene types, called atomic scenes, can be combined to improve prediction for a larger set of high-order scenes. By definition, atomic scenes satisfy the following properties:

Atomicity: An atomic scene depends only on the trajectory of an individual traffic participant. This ensures that a powerful visual sensing framework that can detect and localize an individual traffic participant in 3D suffices to create a feature representation for atomic scenes.

Parsimony: Atomic scenes are shared across several high order scenes and a few atomic scenes can combine to influence prediction for a large number of high-order scenes.

Supervisability: Atomic scenes should be plentiful and easier to label in training data. This also translates into ease for learning and detection in a supervised framework.

Co-occurrence: The presence or absence of an atomic scene also places constraints on other atomic scenes, that is, they may not be independent. itemize With these notions, we are now in a position to learn an effective model for traffic scene recognition that captures scene complexities, yet allows fast inference.

FIG. 2 shows one exemplary model engine that uses two types of observations (X,Y) to infer atomic and high-order scenes (A, H). Atomic scenes are dependent on each other. Each high-order scene depends on all atomic scenes but is conditionally independent of other high-order scenes. Edge weights ($w_h$, $w_y$, $w_a$, $w_s$) are learned parameters that encode relations among scenes and observations To model atomic and high order scenes together with the information provided by the video sequence, the system uses a hierarchical framework that is designed to be scalable for real-world applications. Several properties are desired in the model engine to be well-suited for the scene recognition task:

Multi-label detection: In a typical traffic video, multiple scene of interest may occur simultaneously, or not occur at all. Thus, our model engine must be suited to a problem that resembles detection with a large number of categories, rather than recognition or temporal segmentation.

Structured prediction: The model engine must learn to capture the strong correlations on the mutual occurrence (or mutual exclusivity) of atomic scenes in traffic videos. For instance, pedestrians on a crosswalk often correspond to slow-moving cars and exclude fast-moving ones.

Scalability: The model engine must adequately, but parsimoniously, capture dependences between high-order scenes and atomic scenes. Ensuring that the complexity of inference and learning for the model engine does not grow exponentially with number of scene types is crucial for real-world applications that may consist of a large number of scenes.

Flexibility: The model engine must incorporate different sources of information. For instance, trajectory features might be discriminative for atomic scenes, while holistic image-based features might be informative for high-order scenes. itemize In FIG. 2, we illustrate a model engine for scene recognition that achieves the above goals. Let A={$A_i$} be the set of atomic scenes and H={$H_j$} be the set of high order scenes. These are represented in separate hierarchies of our graphical model, where $A_i$ or $H_j$ may attain a binary label of 0 or 1. Two types of inputs are depicted—the X features provide bottom-up information about individual traffic participants, while the Y features provide scene-level information. Four types of edges reflect model parameters, or weights, that capture relationships between inputs and scenes, as well as within and between various levels of the hierarchy. Edges between the atomic scene nodes capture their mutual co-occurrence or exclusion, while edges between nodes in the two layers of the hierarchy capture possible configurations of atomic scenes into high-order scenes. The edges within the atomic scene layer are dense. Each high-order scene is dependent on all atomic scenes and conditionally independent of others given the atomic scenes.

Features

Our model engine includes two types of features, which contain complementary information corresponding to the two levels of hierarchy in the model engine. Low-level features, X, are designed to capture the 3D location and motion of individual traffic participants, which is informative for atomic scenes. High-level features, Y, capture more holistic properties of traffic participant localizations in the scene, which is informative towards the high-order scenes together with knowledge of atomic scenes. We describe our feature design below that was found to be well-suited for our application, while noting that our framework easily allows alternatives.

Low-Level Features, X

FIG. 3 shows that the low-level X feature is defined by the trajectories of individual traffic participants. Positions and velocities of the traffic participant over a temporal window are determined by 3D localization. These trajectories are quantized into bins learned from training data, along with the trajectory of our own car determined by monocular SFM.

Given monocular video input, object detection is performed to determine 2D bounding boxes in the images, which are tracked using a tracking-by-detection method. We compute the camera pose in every frame using a monocular SFM system, which also computes 3D poses of all traffic participants, based on object tracks and the estimated ground plane.

To capture the trajectory information of a traffic participant, we consider a sliding window of frames spanning the previous 1 second of video. The horizontal position of the traffic participant, x, in camera coordinates corresponding to the most recent frame of this window, is quantized into 10 bins, while its depth z is quantized into 5 bins. Besides the position, we also consider velocity information, which is again quantized into 10 bins for the horizontal component $v_x$ and 5 bins for the depth component $v_z$. For both position and velocity, the boundaries for the quantization bins are learned from the distribution of 3D localizations on training data. We extract the position and velocity quantizations at three frames at time T=0, −0.5 and −1 seconds.

We consider six different categories: car or van, bus or truck, person, bicycle, motorbike and traffic light. The position and velocity information above is accumulated into a histogram for each type of traffic participant. Finally, the driving direction and velocity of our own car are quantized into five bins each. This leads to a descriptor with a total of 30×3×6+10=550 dimensions.

High-Level Features, Y

FIG. 4 shows that the high-level Y feature is designed to capture more holistic information about all traffic participants. It is defined by pooling the positions and confidences of 2D detection outputs for each traffic participant in the image. Recall that the goal of the high-level features is to use image information to capture overall patterns of traffic behavior in the scene. One way to achieve this goal is to use features designed for scene classification, such as object bank or SIFT spatial pyramids. However, much simpler features, that also avoid clutter from background such as buildings and trees, suffice for our application, since all our scenes correspond to traffic situations.

In particular, we consider the output positions and confidences obtained from 2D object detection, for each type of traffic participant. The image is divided into 10 horizontal and 5 vertical regions, which are used to spatially pool the maximum detector score for each participant. This pooling also alleviates the effect of detection noise. We also quantize the number of instances of each object type into 3 bins. This leads to a feature vector of (10×5+3)×6=318 dimensions. While it is possible to use a similar pooling along the ground plane as for the X features, even a pooling on the image plane suffices for the Y features, since their goal is to capture holistic information (rather than accurate trajectories desired for X features) and typical geometries in road scenes are highly constrained.

FIGS. 5A-5B show an exemplary real-time traffic scene recognition for detecting dangerous situations. In this embodiment, input video is provided to a feature detector 100 to determine features based on 3D localization. The feature detector 100 has low level feature detector 101 and high level feature detector 102. The output of detector 100 is provided to a hiearchical graphical model engine 200 with high order scene analyzer 201 and atomic scene analyzer 202. The engine 200 also includes a module 203 for edges and capturing dependencies. The engine 200 in turn communicates with a tractable learning and inference module 300 that outputs scene types to an automobile's advanced warning system (AWS).

In one embodiment, detector 100 performs computation of features based on 3D localization that capture both the behavior of individual traffic participants, as well as the holistic scene information. For detector 101, a trajectory of each individual traffic participant is computed based on structure from motion to estimate position and motion of our own car, object detection and tracking to localize the object in the image and 3D localization to determine the position and velocity of the object in 3D. The hierarchical graphical model 200 captures the complexity of traffic scene recognition, while being scalable, flexible and efficient. For analyzer 201, high-order scenes are defined as the scene types that carry semantic meaning for use in automobile Advanced Warning Systems. For analyzer 202, atomic scenes are defined based on trajectories of individual traffic participants. A few atomic scenes can combine to represent a large variety of traffic scenes. In module 203, edges are formed that capture information flow from low-level features to atomic scenes, from high-level features to high-order scenes, mutual relationships among atomic scenes and relationships between atomic scenes and high-order scenes. A learning and inference framework 300 accounts for the relationships between various scene types. The frame work can use module 301 with an alternating approach for inference that achieves good accuracy, while also being fast enough for real-time applications. The framework 302 can also use a structured SVM framework is proposed for learning the model parameters from labeled training data for atomic scenes and high-order scenes.

Inference

As shown in FIG. 5B, our model engine handles four types of edges: the set of weights denoted $w_a$ utilize the low-level features to predict an atomic scene $A_i$, the $w_h$ utilize the high-level features to predict a high order scene $H_j$, the $w_y$ densely connect the prediction of atomic scenes and high order scenes, while the $w_s$ capture the correlation between different atomic scenes. Given the vector of learned weights $w=(w_a, w_y, w_h, w_s)$, we define a scoring function based on current observations (X, Y) and scene labels (A, H) as:

$$S_w(X, Y, A, H) = \sum_i w_{a_i}^T \psi(X, A_i) + \qquad (1)$$

$$\sum_j w_{y_j}^T \chi(Y, H_j) + \sum_{i,j} w_{h_{ij}}^T \Omega(A_i, H_j) + \sum_{i,j,i \neq j} w_{s_{ij}}^T \Phi(A_i, A_j),$$

where, for i=1, ..., |A| and j=1, ..., |H|, we define $$\psi(X, A_i) = [\overline{A_i}X, A_i X] \qquad (2)$$

$$\chi(Y, H_j) = [\overline{H_j}Y, H_j Y] \qquad (3)$$

$$\Omega(A_i, H_j) = [A_i \wedge H_j, A_i \wedge \overline{H_j}, \overline{A_i} \wedge H_j, \overline{A_i} \wedge \overline{H_j}] \qquad (4)$$

$$\Phi(A_i, A_j) = [A_i \wedge A_j, A_i \wedge \overline{A_j}, \overline{A_i} \wedge A_j, \overline{A_i} \wedge \overline{A_j}], \qquad (5)$$

with $\overline{V}$ the logical negation of Boolean variable V. In our implementation, features in each equation above are long vectors zero-padded at "inactive" locations.

To obtain the most likely explanation of atomic or high order scenes, we must infer the labels for all $A_i \in A$ and $H_j \in H$ that maximize (1). To exhaustively search over all possible configurations quickly becomes intractable, since its complexity is $O(2^{|A|+|H|})$, that is, exponential in the total number of scenes. There are many cycles in the undirected graph of FIG. 2, so standard approaches like belief propagation are not likely to yield an optimal solution. To overcome these issues, an alternating approach that strikes a balance between optimality and speed.

Given the labels for the atomic scenes, we observe that the labels for the high-order scenes can be obtained by exploiting the Y features using belief propagation since the resulting graph is tree-structured. Given the labels for the high-order scenes, we perform a Chow-Liu decomposition to find the closest tree-structured graph (in the sense of KL divergence), on which we may again use belief propagation to obtain the optimal result using the X features, in time linear to number of nodes. We alternate between these two layers until the inferred labels of the atomic scenes and the high-order scenes converge. In our experiments, the labels converge within very few (typically, five) iterations. Since there is no guarantee of convergence to a global optimum, but the convergence itself is rapid, we use multiple (ten, in our implementation) random initializations and select the solution that provides the highest score.

Learning

We learn the weights $w=(w_a, w_y, w_h, w_s)$ from annotated scene labels $(A'_d, H'_d)$ for $d \in D$, where d is the index of one training instance and D is the training dataset, using the cutting plane method (structured SVM, SSVM). The process progressively builds the working set by adding the most violated constraints (MVC) in each iteration. It learns the model parameters that achieve sufficient margin, proportional to the losses, between MVCs and ground truth configurations. For each iteration k, we use the current weights $w^k=(w_a, w_y, w_h, w_s)$ to find the MVC of each training instance d by solving:

$$S'_{w^k}(X_d,Y_d,A_d,H_d) = S_{w^k}(X_d,Y_d,A_d,H_d) + L(A_d,A'_d) + L(H_d,H'_d),\quad (6)$$

where $S_w(X_d, Y_d, A_d, H_d)$ is the scoring function (1) and with $I(\cdot)$ the indicator function, we have defined the loss functions $L(A_d,A'_d)=\Sigma_{i_d \in A_d} I(A_{i_d} \neq A'_{i_d})$ and $L(H_d,H'_d)=\Sigma_{j_d \in H_d}(H_{j_d} \neq H'_{j_d})$.

Given all the MVCs $(A_d^k, H_d^k) \in D$, we update the model parameter $w^{k+1}$ with the following optimization:

$$\min_{w^{k+1},\xi} \frac{1}{2}\|w^{k+1}\|^2 + \sum_{d \in D} \xi_d \quad (7)$$

s.t. $S_{w^{k+1}}(X_d, Y_d, A_d^k, H_d^k) - S_{w^{k+1}}(X_d, Y_d, A_{d'}, H_{d'}) \le$ $\xi_d - L(A_d^k, A_{d'}) - L(H_d^k, H_{d'}), \forall d \in D, \kappa \le k,$ where $\xi_d$ are the slack variables for the training instances.

Timing and Inference

Our SFM, tracking and 3D localization are real-time (30 Hz). While object detection is slower in our unoptimized implementation (2 Hz), we note available speedups. We exploit the structure of our hierarchical model engine for fast inference. In an unoptimized Matlab implementation, the inference for a total of 25 scene types (14 high-order and 11 atomic scenes) requires 100 ms per frame.

Finally, while our inference is fast and scalable, it lacks optimality guarantees. To verify that the inference does not sacrifice too much accuracy, we compare our inference accuracy against the upper bound provided by exhaustive search. Note that exhaustive search quickly becomes computationally infeasible, so we restrict the experiment to a smaller number of scenes (6 high-order scenes and 6 atomic scenes). Our method achieves an accuracy of 0.5200, as opposed to the upper-bound of 0.5269. Thus, we observe only a 1.3% drop in performance using our inference method.

In sum, our approach to monocular scene recognition in complex traffic situations handles several simultaneous scenes with multiple participants, using a decomposition into atomic and high-order scenes. Our modeling is determined by the nature of the problem and requirements of the AWS application. We exploit the fact that a large number of complex scenes can be represented by a few atomic scenes that depend on individual traffic participants, whose positions can be reliably estimated using state-of-the-art 3D localization methods. We use a supervised framework that allows incorporation of labeling input from domain experts, which also motivates the ease of learning desired for our design of atomic scenes. Our experiments show the robustness of our features based on 3D localization. Our model engine captures mutual relationships between scenes, which is demonstrated to be advantageous in comparison to baselines. Further, we introduce a large-scale dataset that contains natural traffic scenes in inner-city environments.

The system can be scaled to handle 200 high-order and 33 atomic scenes. We anticipate that the system can benefit from additional scene elements such as lanes and the imposition of temporal smoothness in the recognition output (distinct from feature design which already encodes temporal information), all of which may further enhance recognition rates.

Figure 6:
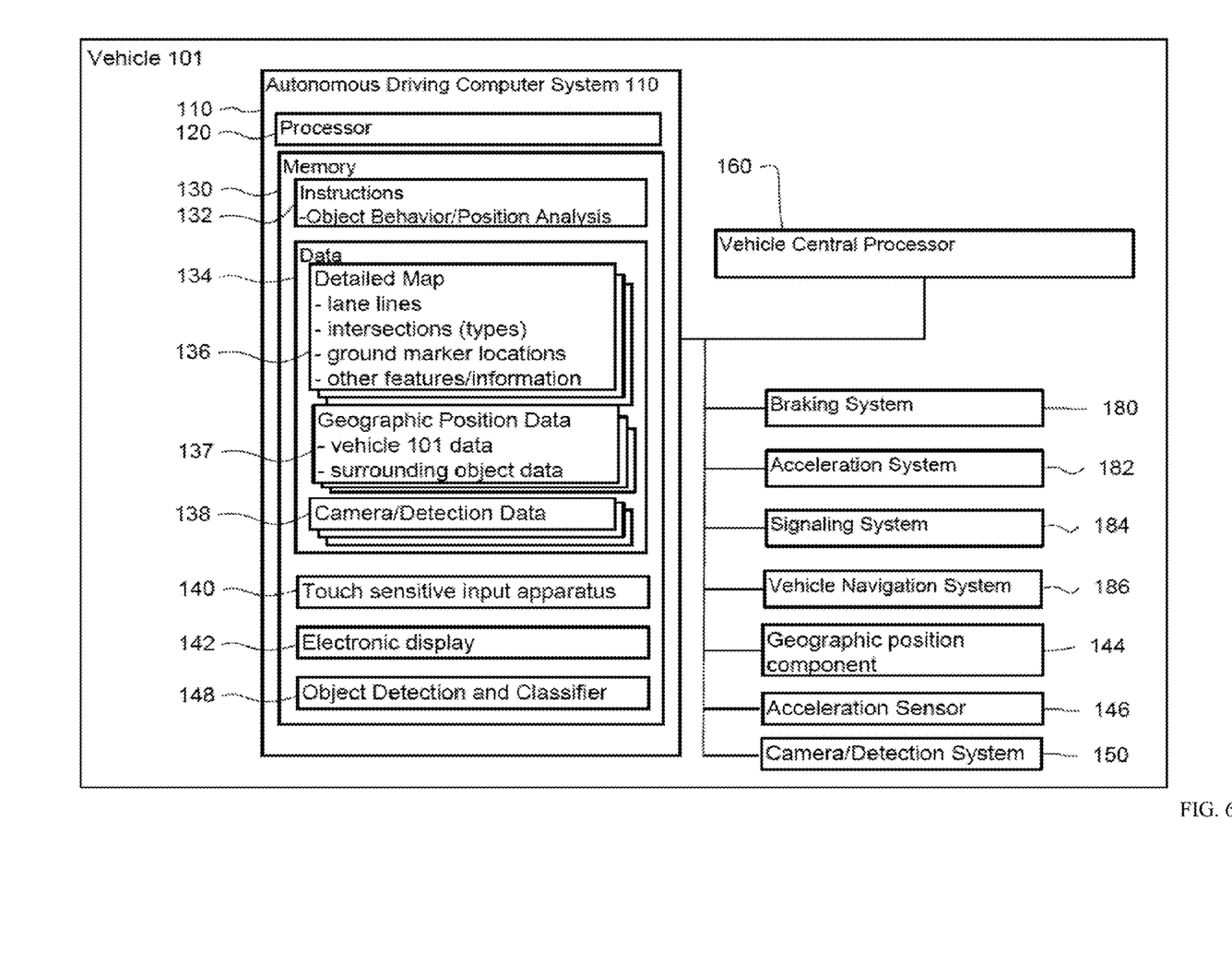
FIG. 6 shows an exemplary smart car architecture.

As shown in FIG. 6, an autonomous driving system 100 in accordance with one aspect includes a vehicle 101 with various components. While certain aspects are particularly useful in connection with specific types of vehicles, the vehicle may be any type of vehicle including, but not limited to, cars, trucks, motorcycles, busses, boats, airplanes, helicopters, lawnmowers, recreational vehicles, amusement park vehicles, construction vehicles, farm equipment, trams, golf carts, trains, and trolleys. The vehicle may have one or more computers, such as computer 110 containing a processor 120, memory 130 and other components typically present in general purpose computers.

The memory 130 stores information accessible by processor 120, including instructions 132 and data 134 that may be executed or otherwise used by the processor 120. The memory 130 may be of any type capable of storing information accessible by the processor, including a computer-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 132 may be any set of instructions to be executed directly (such as machine code) or indirectly (such as scripts) by the processor. For example, the instructions may be stored as computer code on the computer-readable medium. In that regard, the terms "instructions" and "programs" may be used interchangeably herein. The instructions may be stored in object code format for direct processing by the processor, or in any other computer language including scripts or collections of independent source code modules that are interpreted on demand or compiled in advance. Functions, methods and routines of the instructions are explained in more detail below.

The data 134 may be retrieved, stored or modified by processor 120 in accordance with the instructions 132. For instance, although the system and method is not limited by any particular data structure, the data may be stored in computer registers, in a relational database as a table having a plurality of different fields and records, XML documents or flat files. The data may also be formatted in any computer-readable format. By further way of example only, image data may be stored as bitmaps comprised of grids of pixels that are stored in accordance with formats that are compressed or uncompressed, lossless (e.g., BMP) or lossy (e.g., JPEG), and bitmap or vector-based (e.g., SVG), as well as computer instructions for drawing graphics. The data may comprise any information sufficient to identify the relevant information, such as numbers, descriptive text, proprietary codes, references to data stored in other areas of the same memory or different memories (including other network locations) or information that is used by a function to calculate the relevant data.

The processor 120 may be any conventional processor, such as commercial CPUs. Alternatively, the processor may be a dedicated device such as an ASIC. Although FIG. 1 functionally illustrates the processor, memory, and other elements of computer 110 as being within the same block, it will be understood by those of ordinary skill in the art that the processor and memory may actually comprise multiple processors and memories that may or may not be stored within the same physical housing. For example, memory may be a hard drive or other storage media located in a housing different from that of computer 110. Accordingly, references to a processor or computer will be understood to include references to a collection of processors, computers or memories that may or may not operate in parallel. Rather than using a single processor to perform the steps described herein some of the components such as steering components and deceleration components may each have their own processor that only performs calculations related to the component's specific function.

In various aspects described herein, the processor may be located remotely from the vehicle and communicate with the vehicle wirelessly. In other aspects, some of the processes described herein are executed on a processor disposed within the vehicle and others by a remote processor, including taking the steps necessary to execute a single maneuver.

Computer 110 may include all of the components normally used in connection with a computer such as a central processing unit (CPU), memory (e.g., RAM and internal hard drives) storing data 134 and instructions such as a web browser, an electronic display 142 (e.g., a monitor having a screen, a small LCD touch-screen or any other electrical device that is operable to display information), user input (e.g., a mouse, keyboard, touch screen and/or microphone), as well as various sensors (e.g. a video camera) for gathering the explicit (e.g., a gesture) or implicit (e.g., "the person is asleep") information about the states and desires of a person.

The vehicle may also include a geographic position component 144 in communication with computer 110 for determining the geographic location of the device. For example, the position component may include a GPS receiver to determine the device's latitude, longitude and/or altitude position. Other location systems such as laser-based localization systems, inertia-aided GPS, or camera-based localization may also be used to identify the location of the vehicle. The vehicle may also receive location information from various sources and combine this information using various filters to identify a "best" estimate of the vehicle's location. For example, the vehicle may identify a number of location estimates including a map location, a GPS location, and an estimation of the vehicle's current location based on its change over time from a previous location. This information may be combined together to identify a highly accurate estimate of the vehicle's location. The "location" of the vehicle as discussed herein may include an absolute geographical location, such as latitude, longitude, and altitude as well as relative location information, such as location relative to other cars in the vicinity which can often be determined with less noise than absolute geographical location.

The device may also include other features in communication with computer 110, such as an accelerometer, gyroscope or another direction/speed detection device 146 to determine the direction and speed of the vehicle or changes thereto. By way of example only, device 146 may determine its pitch, yaw or roll (or changes thereto) relative to the direction of gravity or a plane perpendicular thereto. The device may also track increases or decreases in speed and the direction of such changes. The device's provision of location and orientation data as set forth herein may be provided automatically to the user, computer 110, other computers and combinations of the foregoing.

The computer may control the direction and speed of the vehicle by controlling various components. By way of example, if the vehicle is operating in a completely autonomous mode, computer 110 may cause the vehicle to accelerate (e.g., by increasing fuel or other energy provided to the engine), decelerate (e.g., by decreasing the fuel supplied to the engine or by applying brakes) and change direction (e.g., by turning the front wheels).

The vehicle may include components 148 for detecting objects external to the vehicle such as other vehicles, obstacles in the roadway, traffic signals, signs, trees, etc. The detection system may include lasers, sonar, radar, cameras or any other detection devices. For example, if the vehicle is a small passenger car, the car may include a laser mounted on the roof or other convenient location. In one aspect, the laser may measure the distance between the vehicle and the object surfaces facing the vehicle by spinning on its axis and changing its pitch. The laser may also be used to identify lane lines, for example, by distinguishing between the amount of light reflected or absorbed by the dark roadway and light lane lines. The vehicle may also include various radar detection units, such as those used for adaptive cruise control systems. The radar detection units may be located on the front and back of the car as well as on either side of the front bumper. In another example, a variety of cameras may be mounted on the car at distances from one another which are known so that the parallax from the different images may be used to compute the distance to various objects which are captured by one or more cameras, as exemplified by the camera of FIG. 1. These sensors allow the vehicle to understand and potentially respond to its environment in order to maximize safety for passengers as well as objects or people in the environment.

In addition to the sensors described above, the computer may also use input from sensors typical of non-autonomous vehicles. For example, these sensors may include tire pressure sensors, engine temperature sensors, brake heat sensors, brake pad status sensors, tire tread sensors, fuel sensors, oil level and quality sensors, air quality sensors (for detecting temperature, humidity, or particulates in the air), etc.

Many of these sensors provide data that is processed by the computer in real-time; that is, the sensors may continuously update their output to reflect the environment being sensed at or over a range of time, and continuously or as-demanded provide that updated output to the computer so that the computer can determine whether the vehicle's then-current direction or speed should be modified in response to the sensed environment.

These sensors may be used to identify, track and predict the movements of pedestrians, bicycles, other vehicles, or objects in the roadway. For example, the sensors may provide the location and shape information of objects surrounding the vehicle to computer 110, which in turn may identify the object as another vehicle. The object's current movement may be also be determined by the sensor (e.g., the component is a self-contained speed radar detector), or by the computer 110, based on information provided by the sensors (e.g., by comparing changes in the object's position data over time).

The computer may change the vehicle's current path and speed based on the presence of detected objects. For example, the vehicle may automatically slow down if its current speed is 50 mph and it detects, by using its cameras and using optical-character recognition, that it will shortly pass a sign indicating that the speed limit is 35 mph. Similarly, if the computer determines that an object is obstructing the intended path of the vehicle, it may maneuver the vehicle around the obstruction.

The vehicle's computer system may predict a detected object's expected movement. The computer system 110 may simply predict the object's future movement based solely on the object's instant direction, acceleration/deceleration and velocity, e.g., that the object's current direction and movement will continue.

Once an object is detected, the system may determine the type of the object, for example, a traffic cone, person, car, truck or bicycle, and use this information to predict the object's future behavior. For example, the vehicle may determine an object's type based on one or more of the shape of the object as determined by a laser, the size and speed of the object based on radar, or by pattern matching based on camera images. Objects may also be identified by using an object classifier which may consider one or more of the size of an object (bicycles are larger than a breadbox and smaller than a car), the speed of the object (bicycles do not tend to go faster than 40 miles per hour or slower than 0.1 miles per hour), the heat coming from the bicycle (bicycles tend to have a rider that emits body heat), etc.

In some examples, objects identified by the vehicle may not actually require the vehicle to alter its course. For example, during a sandstorm, the vehicle may detect the sand as one or more objects, but need not alter its trajectory, though it may slow or stop itself for safety reasons.

In another example, the scene external to the vehicle need not be segmented from input of the various sensors, nor do objects need to be classified for the vehicle to take a responsive action. Rather, the vehicle may take one or more actions based on the color and/or shape of an object.

The system may also rely on information that is independent of the detected object's movement to predict the object's next action. By way of example, if the vehicle determines that another object is a bicycle that is beginning to ascend a steep hill in front of the vehicle, the computer may predict that the bicycle will soon slow down—and will slow the vehicle down accordingly—regardless of whether the bicycle is currently traveling at a relatively high speed.

It will be understood that the foregoing methods of identifying, classifying, and reacting to objects external to the vehicle may be used alone or in any combination in order to increase the likelihood of avoiding a collision.

By way of further example, the system may determine that an object near the vehicle is another car in a turn-only lane (e.g., by analyzing image data that captures the other car, the lane the other car is in, and a painted left-turn arrow in the lane). In that regard, the system may predict that the other car may turn at the next intersection.

The computer may cause the vehicle to take particular actions in response to the predicted actions of the surrounding objects. For example, if the computer 110 determines that another car approaching the vehicle is turning, for example based on the car's turn signal or in which lane the car is, at the next intersection as noted above, the computer may slow the vehicle down as it approaches the intersection. In this regard, the predicted behavior of other objects is based not only on the type of object and its current trajectory, but also based on some likelihood that the object may or may not obey traffic rules or pre-determined behaviors. This may allow the vehicle not only to respond to legal and predictable behaviors, but also correct for unexpected behaviors by other drivers, such as illegal u-turns or lane changes, running red lights, etc.

In another example, the system may include a library of rules about object performance in various situations. For example, a car in a left-most lane that has a left-turn arrow mounted on the light will very likely turn left when the arrow turns green. The library may be built manually, or by the vehicle's observation of other vehicles (autonomous or not) on the roadway. The library may begin as a human-built set of rules which may be improved by vehicle observations. Similarly, the library may begin as rules learned from vehicle observation and have humans examine the rules and improve them manually. This observation and learning may be accomplished by, for example, tools and techniques of machine learning.

In addition to processing data provided by the various sensors, the computer may rely on environmental data that was obtained at a previous point in time and is expected to persist regardless of the vehicle's presence in the environment. For example, data 134 may include detailed map information 136, for example, highly detailed maps identifying the shape and elevation of roadways, lane lines, intersections, crosswalks, speed limits, traffic signals, buildings, signs, real time traffic information, or other such objects and information. Each of these objects such as lane lines or intersections may be associated with a geographic location which is highly accurate, for example, to 15 cm or even 1 cm. The map information may also include, for example, explicit speed limit information associated with various roadway segments. The speed limit data may be entered manually or scanned from previously taken images of a speed limit sign using, for example, optical-character recognition. The map information may include three-dimensional terrain maps incorporating one or more of objects listed above. For example, the vehicle may determine that another car is expected to turn based on real-time data (e.g., using its sensors to determine the current GPS position of another car) and other data (e.g., comparing the GPS position with previously-stored lane-specific map data to determine whether the other car is within a turn lane).

In another example, the vehicle may use the map information to supplement the sensor data in order to better identify the location, attributes, and state of the roadway. For example, if the lane lines of the roadway have disappeared through wear, the vehicle may anticipate the location of the lane lines based on the map information rather than relying only on the sensor data.

The vehicle sensors may also be used to collect and supplement map information. For example, the driver may drive the vehicle in a non-autonomous mode in order to detect and store various types of map information, such as the location of roadways, lane lines, intersections, traffic signals, etc. Later, the vehicle may use the stored information to maneuver the vehicle. In another example, if the vehicle detects or observes environmental changes, such as a bridge moving a few centimeters over time, a new traffic pattern at an intersection, or if the roadway has been paved and the lane lines have moved, this information may not only be detected by the vehicle and used to make various determination about how to maneuver the vehicle to avoid a collision, but may also be incorporated into the vehicle's map information. In some examples, the driver may optionally select to report the changed information to a central map database to be used by other autonomous vehicles by transmitting wirelessly to a remote server. In response, the server may update the database and make any changes available to other autonomous vehicles, for example, by transmitting the information automatically or by making available downloadable updates. Thus, environmental changes may be updated to a large number of vehicles from the remote server.

In another example, autonomous vehicles may be equipped with cameras for capturing street level images of roadways or objects along roadways.

Computer 110 may also control status indicators 138, in order to convey the status of the vehicle and its components to a passenger of vehicle 101. For example, vehicle 101 may be equipped with a display 225, as shown in FIG. 2, for displaying information relating to the overall status of the vehicle, particular sensors, or computer 110 in particular. The display 225 may include computer generated images of the vehicle's surroundings including, for example, the status of the computer, the vehicle itself, roadways, intersections, as well as other objects and information.

Computer 110 may use visual or audible cues to indicate whether computer 110 is obtaining valid data from the various sensors, whether the computer is partially or completely controlling the direction or speed of the car or both, whether there are any errors, etc. Vehicle 101 may also include a status indicating apparatus, such as status bar 230, to indicate the current status of vehicle 101. In the example of FIG. 2, status bar 230 displays "D" and "2 mph" indicating that the vehicle is presently in drive mode and is moving at 2 miles per hour. In that regard, the vehicle may display text on an electronic display, illuminate portions of vehicle 101, or provide various other types of indications. In addition, the computer may also have external indicators which indicate whether, at the moment, a human or an automated system is in control of the vehicle, that are readable by humans, other computers, or both.

In one example, computer 110 may be an autonomous driving computing system capable of communicating with various components of the vehicle. For example, computer 110 may be in communication with the vehicle's conventional central processor 160, and may send and receive information from the various systems of vehicle 101, for example the braking 180, acceleration 182, signaling 184, and navigation 186 systems in order to control the movement, speed, etc. of vehicle 101. In addition, when engaged, computer 110 may control some or all of these functions of vehicle 101 and thus be fully or merely partially autonomous. It will be understood that although various systems and computer 110 are shown within vehicle 101, these elements may be external to vehicle 101 or physically separated by large distances.

Systems and methods according to aspects of the disclosure are not limited to detecting any particular type of objects or observing any specific type of vehicle operations or environmental conditions, nor limited to any particular machine learning technique, but may be used for deriving and learning any driving pattern with any unique signature to be differentiated from other driving patterns.

The sample values, types and configurations of data described and shown in the figures are for the purposes of illustration only. In that regard, systems and methods in accordance with aspects of the disclosure may include various types of sensors, communication devices, user interfaces, vehicle control systems, data values, data types and configurations. The systems and methods may be provided and received at different times (e.g., via different servers or databases) and by different entities (e.g., some values may be pre-suggested or provided from different sources).

As these and other variations and combinations of the features discussed above can be utilized without departing from the systems and methods as defined by the claims, the foregoing description of exemplary embodiments should be taken by way of illustration rather than by way of limitation of the disclosure as defined by the claims. It will also be understood that the provision of examples (as well as clauses phrased as "such as," "e.g.", "including" and the like) should not be interpreted as limiting the disclosure to the specific examples; rather, the examples are intended to illustrate only some of many possible aspects.

Unless expressly stated to the contrary, every feature in a given embodiment, alternative or example may be used in any other embodiment, alternative or example herein. For instance, any appropriate sensor for detecting vehicle movements may be employed in any configuration herein. Any data structure for representing a specific driver pattern or a signature vehicle movement may be employed.

What is claimed is:

1. A method to provide an Advanced Warning System (AWS) for a driver of a vehicle, comprising:
   capturing traffic scene types from a single camera video;
   generating high-level and low-level features based on 3D localization;
   providing the high and low level features to a hierarchical graphical model engine to process high order scenes and atomic scenes and that accounts for relationships among atomic scenes, and between atomic scenes and high-order scenes with edge weights as learned parameters that encode relations among scenes and observations to achieve accuracy;
   performing tractable learning and inference in real-time; and
   communicating an AWS warning to the driver.

2. The method of scenes of interest are semantically meaningful and represent potential inputs for an early warning system.

3. The method of claim 1, comprising categorizing scenes into high-order and atomic scenes.

4. The method of claim 1, comprising determining features based on 3D localization that capture both the behavior of individual traffic participants, as well as the holistic scene information.

5. The method of claim 1, wherein a trajectory of each individual traffic participant is determined based on structure from motion to estimate position and motion of the vehicle.

6. The method of claim 1, comprising performing object detection and tracking to localize the object in the image and 3D localization to determine the position and velocity of the object in 3D.

7. The method of claim 1, comprising detecting atomic scenes based on trajectories of individual traffic participants.

8. The method of claim 7, comprising combining atomic scenes to represent a large variety of traffic scenes.

9. The method of claim 1, comprising forming edges that capture information flow from low-level features to atomic scenes, from high-level features to high-order scenes, mutual relationships among atomic scenes and relationships between atomic scenes and high-order scenes.

10. The method of claim 1, comprising learning and inferencing situations that account for the relationships between various scene types.

11. The method of claim 1, comprising learning model parameters from labeled training data for atomic scenes and high-order scenes with a structured SVM framework.

12. The method of claim 1, comprising capturing relationships where multiple scenes occur simultaneously and correlated with each other.

13. The method of claim 12, comprising capturing relationships with a hierarchical graphical model engine.

14. The method of claim 1, comprising deriving features based on 3D object localization, which determines the trajectories of individual objects.

15. The method of claim 1, comprising applying high-level features that capture holistic information about the scene.

16. The method of claim 1, comprising performing intensity aligned object pose.

17. The method of claim 1, comprising performing epipolar guided dense tracking.

18. The method of claim 1, comprising detecting SFM cues.

19. The method of claim 1, comprising determining bounding box cues.

20. The method of claim 1, comprising:
generating real-time monocular SFM and 2D object detection from the single camera video;
detecting a ground plane from the real-time monocular SFM and the 2D object detection;
performing dense 3D estimation from the real-time monocular SFM and the 2D object detection; and
generating a joint 3D object localization from the ground plane and dense 3D estimation.

* * * * *